United States Patent [19]

Winters

[11] Patent Number: 4,860,916
[45] Date of Patent: Aug. 29, 1989

[54] TANK AND METHOD OF MAKING SAME
[75] Inventor: Raymond S. Winters, LaGrange, Ill.
[73] Assignee: Environetics, Inc., Lockport, Ill.
[21] Appl. No.: 244,325
[22] Filed: Sep. 15, 1988
[51] Int. Cl.⁴ .............................................. B65D 8/12
[52] U.S. Cl. ................................... 220/5 A; 220/1 B; 220/403; 220/461
[58] Field of Search .................. 4/506; 220/1 B, 5 A, 220/403, 410, 461

[56] References Cited

U.S. PATENT DOCUMENTS

| | | | |
|---|---|---|---|
| 3,233,251 | 2/1966 | Barrera | 4/172 |
| 3,302,825 | 2/1967 | Schleeweiss | 220/67 |
| 3,409,916 | 11/1968 | Billig et al. | 220/1 B X |
| 3,419,918 | 1/1969 | Petrik | 220/461 |
| 3,460,705 | 8/1969 | Green | 220/5 |
| 3,486,289 | 12/1969 | Lavack | 52/742 |
| 3,644,941 | 2/1972 | Kuss | 4/506 X |
| 3,648,303 | 3/1972 | Stewart et al. | 4/506 X |
| 3,738,527 | 6/1973 | Townsend | 220/63 |
| 3,841,041 | 10/1974 | Friedland et al. | 52/169 |
| 4,068,777 | 1/1978 | Humphrey et al. | 220/1 B |
| 4,756,033 | 7/1988 | Schelfhorst | 4/506 |

FOREIGN PATENT DOCUMENTS 52-26612  2/1977  Japan .................................. 220/1 B Primary Examiner—Gerald A. Michalsky
Attorney, Agent, or Firm—Charles M. Kaplan

[57] ABSTRACT

The liquid impervious liner in a field erected liquid holding tank that can be dismantled and reassembled is protected from damage by placing a reusable liner buffer in the form of a blanket of load spreading, cushioning material between the liner and the wall of the tank and the ground or tank foundation. Methods of erecting tanks using liner buffers to protect liquid holding liners are disclosed.

21 Claims, 1 Drawing Sheet

U.S. Patent   Aug. 29, 1989   4,860,916
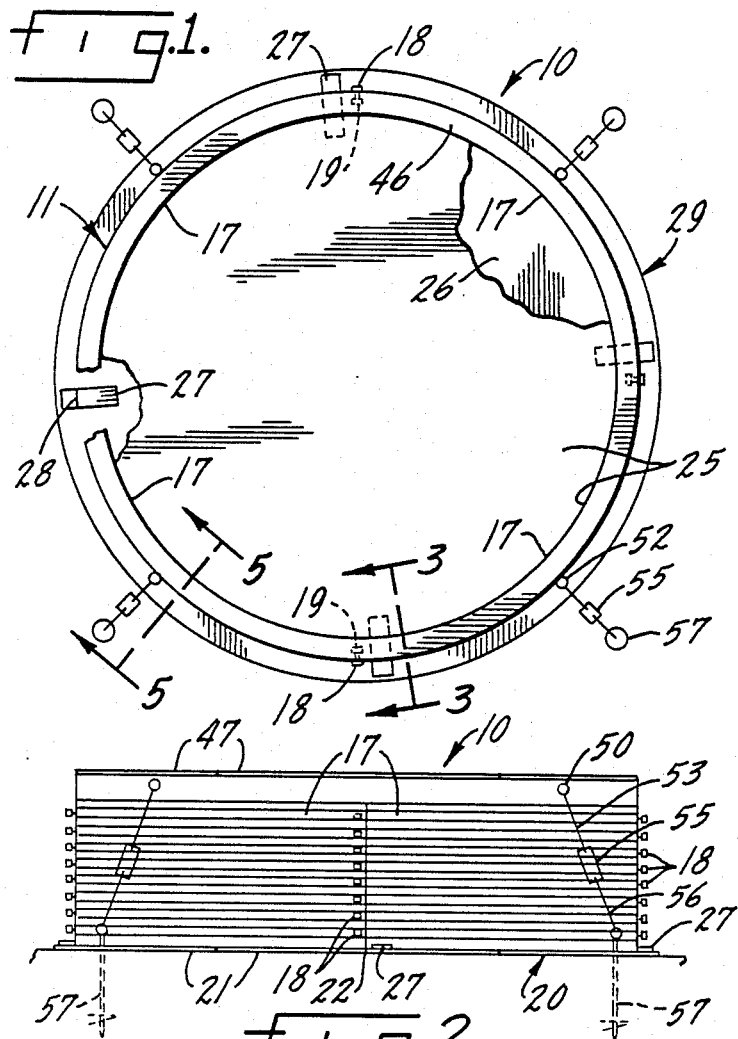
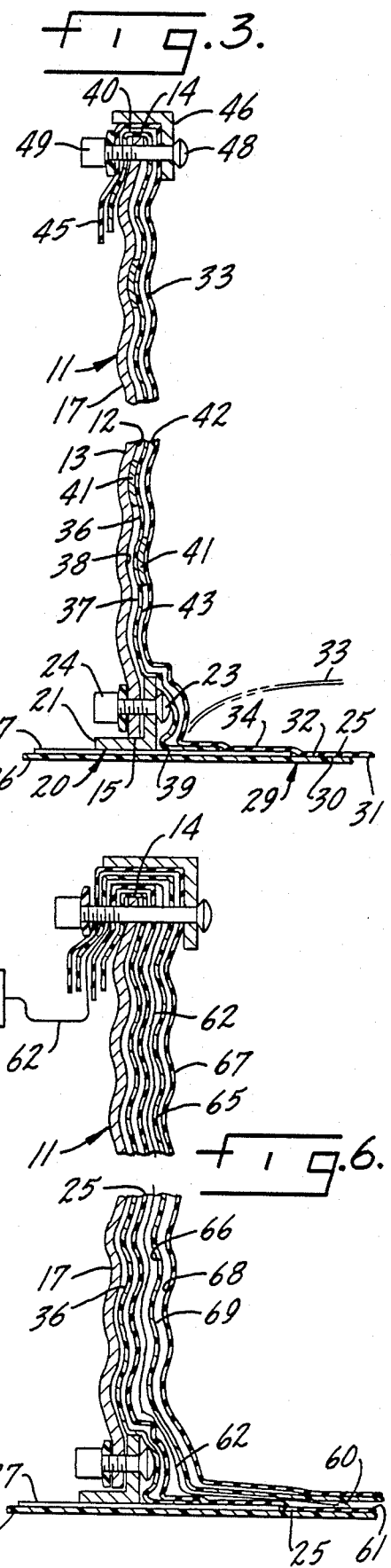

TANK AND METHOD OF MAKING SAME

BACKGROUND OF THE INVENTION

This invention relates to liquid containers and more particularly to field erected storage tanks that are adapted to being dismantled after they have been used, moved to another location, and then erected again. Such tanks are ordinarily made from standard sheet metal or corrugated panels that are bolted together to form an upstanding peripheral wall which is not capable of containing a liquid. To hold the liquid in the tank, a sheet of plastic or other liquid impervious material is placed along the inside of the tank wall and on top of the ground or foundation within the wall. Such liners are frequently damaged by sharp or irregular objects or areas on the tank wall, such as bolt heads and the wall's peripheral edges, and by objects on the ground. Also, as the tank is filled with and emptied of liquid, and as wind and other loads on the tank change the stresses on the liner, it can be damaged by rubbing against the tank wall and by streching or bunching up. Prior attempts to protect the liner from such damage have been complicated or have required special tank or liner structure. Also, it has been suggested that dirt be piled up to form a cove at the bottom of the tank to protect the liner where it bends to go up the tank wall. This has not been satisfactory because the dirt cover may fall away from the tank wall as the liner is shifted into place, or it may settle and cause stress on the liner walls, seams, or base; also the dirt may contain sharp objects, or may itself be abrasive enough, to damage the liner.

OBJECTIVES OF THE INVENTION

Accordingly, it is an object of this invention to provide improved liquid storage tank and improved methods of making such tanks.

Another object is to protect the removable liquid impervious liner of a field erected storage tank.

Another object is to provide means for protecting a tank liner that is reusable when the tank is dismantled and reassembled.

Another object is to securely anchor to the earth a portable, field-erected, thin-shelled liquid storage tank so that it will withstand wind forces before it is filled and as the liquid level in it varies.

Another object is to detect leaks in the flexible sheet liner of liquid storage tanks in a way that does not penetrate the liner.

Another object is to provide a tank liner that can be held in place as the tank wall is erected around it and that assures that the wall and liner are properly positioned when such erection is completed.

Another object is to provide methods of erecting liquid storage tanks that employ one or more removable fibrous mats or blankets that protect the tank liner from damage.

Another object is to provide a liquid storage tank having a liquid impervious liner and a reusable protective liner buffer that can be easily field erected, dismantled, transported and re-erected numerous times, that is relatively inexpensive, durable, easily maintained, non-polluting, and which does not contain defects found in similar prior art tanks.

Other objects and advantages of the invention will be revealed in the specification and claims, and the scope of the invention will be set forth in the claims.

DESCRIPTION OF THE DRAWINGS

FIG. 1 is a schematic, partially broken-away top plan view of a liquid storage tank in accord with this invention.

FIG. 2 is a side view of the tank of FIG. 1.

FIG. 3 is a cross sectional view taken generally along the line 3—3 in FIG. 1.

FIG. 4 is a partial cross sectional view corresponding to FIG. 3 showing another embodiment of the invention.

FIG. 5 is a partial cross sectional view taken generally along the line 5—5 in FIG. 1.

FIG. 6 is a cross sectional view corresponding to FIG. 3 showing another embodiment of the invention.

DESCRIPTION OF THE INVENTION

The drawing shows a thin-shelled tank 10 for holding liquid that can be field erected, disassembled, transported to another location and re-erected numerous times. Tank 10 has an upstanding, generally cylindrical, open-ended wall or enclosure 11 that has an inner surface 12, and outer surface 13, an upper or top edge 14, and a lower or bottom edge 15. Wall 11 may be made from a plurality of overlapping, detachable, relatively thin, corrugated wall sections or panels 17 that have been connected to each other in a conventional manner, such as by standard nuts 18 and bolts 19 that pass through holes in the overlapped areas of the panels. Panels 17 also may be connected to each other by a lower stiffener ring 20 made from sections 21 of angle iron that span the joints as at 22 where adjacent panels are bolted to each other. Sections 21 are attached to panels 17 by bolts 23 and nuts 24 with one leg of the angle iron underneath the enclosure lower edge 15.

Enclosure wall 11 has irregular and sharp areas, such as at adjacent overlapping panels 17 and at bolts 23, that are capable of puncturing or otherwise damaging the tank liner 25. To prevent such damage, one or more reusable liquid pervious flexible, removable, liner buffers 26 are placed between wall 11 and the tank liner. Liner buffer 26 is preferably one or more mats of geotextile material made from an integral network of discrete, spun-bonded, non-woven, synthetic plastic fibers. This type of material will disperse the point and line loads at the sharp and irregular areas. The material will also spread the loads imposed on the earth under edge 15 to minimize sinking of the enclosure wall into the earth, and will protect liner 25 from foot traffic when the tank is being assembled. Also, this type of mat will spread the load in liner 25 so as to reduce stretching as the tank is filled with and emptied of liquid, and as the tank deforms under atmospheric loads. For example, Mirafi 1160 N Polypropylene geotextile sheet material approximately 200 mils thick has been used for this purpose. The liner buffer 26 should be at least about twice as thick as the liner 25 so that its bulk will act as a cushion or blanket protecting liner 25.

Liner 25 is also reusable and may be made from any suitable flexible liquid impervious sheet material, such as B.F. Goodrich ENV 3602-10 Hypalon synthetic rubber approximately 36 mils thick including an internal 10×10, 1000 denier polyester woven scrim. Liner 25 must be an integral sheet of material, preferably about twenty-five to fifty mils thick, but may be made from separate pieces that have been bonded to each other. Also, a plurality of generally rectangular tabs 27 may be bonded or solvent welded to the underside of liner 25 at predetermined locations. Preferably, tabs 27 are made from the same sheet material as liner 25, but the tabs may be thicker. Tabs 27 are positioned on liner 25 so that they will be under ring 20 after wall 11 has been erected. To help locate wall sections 17, tabs 27 may be imprinted with suitable indicia, such as line 28, for indicating where a wall section should be placed. Tabs 27 will also hold liner 25 in place and help prevent it from being blown away from the tank wall before tha tank is filled with liquid.

This invention includes methods of making tank 10 and protecting liner 25. The tank 10 shown in FIGS. 1-3 may be constructed by initially placing a first discrete liner buffer section 29 with its outside surface 30 on the ground or foundation where tank 10 is to be erected. The diameter of buffer section 29 should be greater than that of the tank. Then liner 25 is placed over buffer section 29 with the outside surface 31 of the liner in contact with the inside surface 32 of the buffer. At this time the portion 33 of the liner that will extend up wall 11 is folded back on top of the central portion 34 of the liner, as shown in phantom in FIG. 3. Tabs 27 extend out from the underside of central portion 34 to adjacent the peripheral edge of the liner buffer, and the lines 28 on the tabs show where the wall sections should be located. Wall sections 17 are than moved into place over lines 28 and bolted to each other to define the tank enclosure, and ring 20 is bolted to its underside. A second liner buffer section 36 has its outer surface 37 placed against the inner surface 38 of the enclosure wall. Buffer section 36 should slightly overlap tabs 27 and buffer section 29 at its bottom edge 39, and its top edge 40 should be folded over and overlap the tank upper edge 14. Buffer section 36 may be held in place during construction of tank 10 by appropriately placed pieces 41 of double sided adhesive tape. Liner portion 33 is then unfolded and its outer surface 42 is placed against the inner surface 43 of buffer section 36. Pieces 41 of double sided adhesive may also be used to hold the liner temporarily in place. The top edge 45 of liner 25 is folded over the tank upper edge 14, where the folded portion of liner buffer 26 cushions and protects the liner from the metal edge 14. The liner and its buffer may be clamped in place at the top of the tank by an upper stiffener ring 46 made from sections 47 of angle iron that span the enclosure wall joints in the same manner as lower ring 20. Sections 47 are attached to panels 17 by removable bolts 48 and nuts 49 that pass through holes in the liner and buffer, and one leg of the angle iron is above tank edge 14. Buffer 26 protects liner 25 at the bolt holes by cushioning the liner on both sides of panels 17.

FIG. 4 illustrates another method of constructing tank 10 that is identical to that of FIGS. 1-3, except that liner 25 does not have the tabs 27 and liner buffer 26 may be a single sheet of geotextile cushioning material. In this embodiment enclosure wall 11 if first erected by bolting together panels 17 and lower ring 20 as previously described. Then liner buffer 26 is placed inside of the wall with its outside surface 30 lying on the ground or tank foundation and surface 30 is also held against the inside surface 38 of enclosure wall 11 by adhesive pieces 41. Next, liner 25 is placed inside wall 11 with its outside surface 31 in contact with the inside surface 32 of the buffer. The upper portions of liner 25 and buffer 26 are then folded over the top edge 14 of the enclosure and clamped in place by an upper stiffener ring 46 as previously described.

FIGS. 1, 2 and 5 show how tank 10 may be securely anchored to the earth so that it can withstand wind loads and stresses as caused by varying liquid levels. Eye bolts 50 pass through panels 17 and upper ring 46 and are held in place by nuts 51. Eyes 52 on the outside of tank 10 are attached to cable segments 53 by clamps 54, and turnbuckles 55 connect segments 53 to other cable segments 56, which are attached to earth anchors 57. Grommets 58 may be applied to liner 25 and buffer 26 where they are penetrated by bolts 50 and 48.

FIG. 6 shows another embodiment of the invention that is identical to that of FIGS. 1-3, or FIG. 4, except that means for detecting a leak in the liner has been added. First, tank 11 is erected by the method described with reference to FIGS. 1-3, or FIG. 4 up to the point where upper stiffener ring 46 and eye bolts 50 are attached. Before these elements are connected to the upper edge 14 of panels 17, moisture sensing means 60 is placed on top of the inner surface 61 of liner 25. Moisture sensor 60 is connected by an insulated wire conductor 62 to signalling means 63 on the outside of tank 10. Conductor 62 extends along the surface of liner 25 up and over the portion that overlaps edge 14. A second liner buffer 65 has its outer surface 66 placed on top of the inner surface of liner 25 and over sensor 60 and conductor 62, and a second or top liner 67 is placed on top of buffer 65 with its outer surface 68 in contact with the inner surface 69 of buffer 65. Signalling means 63 may be connected to a source of a.c. power or may be battery operated, and may provide either or both an audible and visual signal that liquid has penetrated the top liner 67. Signalling means 63 with buffer 65 and a top liner 67 and sensor 60 may also be used with the embodiment of FIG. 4 simply by placing sensor 60 and wire 62 between liner 25 and buffer 26 before the liner is placed on top of the buffer. In a similar manner, in the embodiment of FIG. 6, another sensor 60 and conductor 62 may be placed on top of buffer 26 before liner 25 is placed on top of it. All of the component of the leak detecting means are conventional.

It has thus been shown that by the practice of this invention a tank liner 25 can be protected from damage by placing liner buffer 26 between liner 25 and the tank enclosure 11 and the ground or foundation where the tank is erected. Liner 25 and buffer 26 are reusable and easily portable to a new location when tank 10 is dismantled and reassembled. The wall 11 may be made from relatively thin corrugated plates or panels 17 and the tank is securely held in place by earth anchors 57 that are connected by turnbuckles 55 to removable eyebolts 50 that pass through liner 25 without harming the liner because it is cushioned on both sides by buffer 26. Indicia 28 on tabs 27 of liner 25 ensure that panels 17 are positioned accurately during field erection, and the tabs enable the weight of panels 17 to keep the liner from being blown or moved out of place before the tank is filled with liquid. When liner buffer 26 is made from a geotextile material, the load spreading qualities of such material disperse the loads on the liner and prevent its being damaged by puncturing, stretching, and abrasion. Also, geotextile buffers 26 can act to evacuate moisture from the condensation that sometimes occur between the tank inner surface 38 and the outer surface 42 of the liner. Such evacuation of moisture can occur by gravity flow of the moisture down buffer 26, and by wicking action up and down the buffer, especially when the tank surface adjacent rings 21 and 46 is heated by the sun. Buffer 26 may also provide thermal insulation for the liquid in tank 20. The detecting method employing second liner 67 and buffer 65 provides back up protection if a leak is discovered in liner 67 because liner 25 will still be intact and conductor 62 does not have to pass through the liner. Liner buffer 26 also acts to protect conductor 62 in the same ways it protects the liner.

While this invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of this invention.

What is claimed is:

1. A tank for holding liquid that can be erected, disassembled, and re-erected comprising:
   A. an upstanding enclosure having inner and outer surfaces and upper and lower edges that may have irregular or sharp areas, said enclosure comprising detachably connected wall sections;
   B. a removable, flexible, liquid pervious liner buffer within said enclosure comprising an integral network of discrete interconnected synthetic plastic fibers, said liner buffer having inner and outer surfaces, and said liner buffer overlying and substantially conforming in shape to said inner surface of said enclosure;
   C. a removable, flexible, liquid impervious inner liner within said enclosure comprising a polymer thermoplastic sheet, said liner having inner and outer surfaces, and said liner overlying and substantially conforming in shape to said inner surface of said liner buffer;
   D. clamp means adjacent said upper edge of said enclosure holding the overlapping parts of said liner buffer and liner at said upper edge, said clamp means comprising an eye bolt having its eye outside of said tank, anchor means secured in the ground, and turnbuckle means connecting said eye to said anchor;
   E. said outer surface of said liner buffer being in contact with said inner surface of said enclosure and overlaping said upper edge of said enclosure so as to form an upper edge protective cushion, said outer surface of said liner being in contact with said inner surface of said liner buffer and having a portion that overlaps said protective cushion, whereby said buffer protects said liner from damage by preventing said liner from contacting said irregular or sharp areas of said enclosure.

2. The invention defined in claim 1, wherein said liner buffer comprises a plurality of sections at least one of which extends beneath said lower edge beyond said outer surface of said enclosure, and said liner comprises a plurality of hold down tabs which extend beyond said outer surface of said enclosure between said lower edge and said one section of said liner buffer, and said protective cushion comprises at least one additional section of said liner buffer that is completely above said tabs.

3. A tank for holding liquids comprising:
   A. an upstanding enclosure wall having inner and outer surfaces and upper and lower edges said enclosure wall defining a bottom surface therewithin:
   B. a removable, flexible, liner buffer within said enclosure wall, said buffer having inner and outer surfaces, said liner buffer overlying completely and continuously and substantially conforming in shape to said inner surface of said enclosure wall from said lower to said upper edge, and said liner buffer also overlying completely and continuously and substantially conforming in shape to said bottom surface;
   C. a removable, flexible, liquid impervious inner liner within said enclosure, said liner comprising a plastic sheet having a thickness in the range of about 25 to 50 mils, said liner having inner and outer surfaces and said liner overlying and substantially conforming in shape to said inner surface of said liner buffer, said surfaces of said enclosure wall and said bottom surface being capable of damaging said liner;
   D. said outer surface of said liner buffer being in contact with said inner surface of said enclosure wall and said bottom surface, said outer surface of said liner being in contact with said inner surface of said liner buffer, whereby said liner buffer protects said liner from damage by preventing said liner from contacting surfaces of said enclosure wall and said bottom surface; and
   E. said liner buffer comprising a liquid pervious fibrous mat made of an integral network of discrete interconnected synthetic plastic fibers, said mat having a thickness of at least about twice said thickness of said liner.

4. A tank for holding liquids comprising:
   A. an upstanding enclosure having inner and outer surfaces;
   B. a removable, flexible, liner buffer within said enclosure, said buffer having inner and outer surfaces, and said liner buffer overlying and substantially conforming in shape to said inner surface of said enclosure;
   C. a removable, flexible, liquid impervious inner liner within said enclosure, said liner having inner and outer surfaces, and said liner overlying and substantially conforming in shape to said inner surface of said liner buffer, said surfaces of said enclosure being capable of damaging said liner, said liner having a plurality of hold down tabs which extend beyond said outer surface of said enclosure beneath its lowermost edge; and
   D. said outer surface of said liner buffer being in contact with said inner surface of said enclosure, said outer surface of said liner being in contact with said inner surface of said liner buffer, whereby said liner buffer protects said liner from damage by preventing said liner from contacting surfaces of said enclosure.

5. A tank for holding liquids comprising:
   A. an upstanding enclosure having inner and outer surfaces;
   B. a removable, flexible, liner buffer within said enclosure, said buffer having inner and outer surfaces, and said liner buffer overlying and substantially conforming in shape to said inner surface of said enclosure;
   C. a removable, flexible, liquid impervious inner liner within said enclosure, said liner having inner and outer surfaces, and said liner overlying and substantially conforming in shape to said inner surface of said liner buffer; said surfaces of said enclosure being capable of damaging said liner;

D. said outer surface of said liner buffer being in contact with said inner surface of said enclosure, said outer surface of said liner being in contact with said inner surface of said liner buffer, whereby said liner buffer protects said liner from damage by preventing said liner from contacting surfaces of said enclosure; and E. means for detecting a leak that has caused liquid to pass through said liner comprising moisture sensing means beneath said liner, signalling means on the outside of said tank, and an electrical conductor connecting said moisture sensing means to said signalling means without passing through said liner and said buffer.

6. A tank for holding liquid comprising:

A. an upstanding enclosure having inner and outer surfaces, and upper and lower edges;

B. a removable, flexible, liner buffer within said enclosure, said buffer having inner and outer surfaces, and said liner buffer overlying and substantially conforming in shape to said inner surface of said enclosure;

C. a removable, flexible, liquid impervious inner liner within said enclosure, said liner having inner and outer surfaces, and said liner overlying and substantially conforming in shape to said inner surface of said liner buffer, said surfaces of said enclosure being capable of damaging said liner; and D. said outer surface of said liner buffer being in contact with said inner surface of said enclosure, said outer surface of said liner being in contact with said inner surface of said liner buffer, whereby said liner buffer protects said liner from damage by preventing said liner from contacting surfaces of said enclosure, and said buffer overlapping said upper edge of said enclosure so as to form an upper edge protective cushion, and said liner having a portion that overlaps said protective cushion.

7. The invention defined in claim 6, further comprising leak detecting means comprising moisture sensing means on top of said inner surface of said liner, said moisture sensing means producing an electrical signal when moisture is present, wire conductor means connected to said moisture sensing means and extending along said inner surface of said liner up and over said liner portion that overlaps said upper edge of said enclosure, said conductor means having an end connected to a signalling means on the outside of said tank, and a second liner buffer on top of the first mentioned liner essentially completely covering said first mentioned liner, and a second liner on top of said second buffer essentially completely covering said second buffer, said moisture sensor and its wire conductor means being located between said first mentioned liner and said second buffer, whereby, said signalling means senses liquid leaks in said second liner without penetrating either liner, and said first mentioned liner provides a back-up barrier preventing liquid from leaking from said tank when said first mentioned liner has been broken.

8. The invention defined in claim 6, further comprising clamp means adjacent said upper edge of said enclosure holding the overlapping parts of said buffer and liner at said upper edge.

9. The invention defined in claim 8, wherein said clamp means comprises an eye bolt having its eye outside of said tank, anchor means secured in the ground, and means connecting said eye to said anchor.

10. A tank for holding liquids comprising:

A. an upstanding enclosure having inner and outer surfaces, and upper and lower edges;

B. a removable, flexible, liner buffer within said enclosure, said buffer having inner and outer surfaces, and said liner buffer overlying and substantially conforming in shape to said inner surface of said enclosure; said liner buffer comprising a plurality of sections at least one of which extends beneath said lower edge beyond said outer surface of said enclosure;

C. a removable, flexible, liquid impervious inner liner within said enclosure, said liner having inner and outer surfaces, and said liner overlying and substantially conforming in shape to said inner surface of said liner buffer, said surfaces of said enclosure being capable of damaging said liner; and D. said outer surface of said liner buffer being in contact with said inner surface of said enclosure, said outer surface of said liner being in contact with said inner surface of said liner buffer, whereby said liner buffer protects said liner from damage by preventing said liner from contacting surfaces of said enclosure.

11. The invention defined in claim 10, wherein said liner buffer comprises at least one additional section that overlaps said upper edge of said enclosure.

12. The invention defined in claim 10, wherein said liner comprises a plurality of hold down tabs which extend beyond said outer surface of said enclosure between said lower edge and said one section of said liner buffer.

13. The method of protecting a removable liquid impervious liner of a liquid holding tank that can be erected, dismantled, and re-erected, comprising the steps of placing the outside surface of a removable liner buffer against the inside surface of said tank and folding a portion of said buffer over the upper edge of said tank in overlapping relationship, and placing the outside surface of said liquid impervious liner against the inside surface of said liner buffer and overlapping said portion of said buffer with said liner, whereby said liner buffer provides a removable protective cushion between said liner and said tank and said liner and said upper edge of said tank that prevents irregular or sharp surfaces from damaging said liner.

14. The invention defined in claim 13, further comprising the steps of:

A. erecting an upstanding peripheral wall of said tank;

B. placing the outside surface of said liner buffer on top of the bottom of said tank and against said wall; and C. placing the outside surface of said liner against the inside surface of said liner buffer.

15. The invention defined in claim 13, further comprising constructing said liner buffer from a liquid pervious mat of discrete interconnected synthetic plastic fibers.

16. The method of protecting a removable liquid impervious liner of a liquid holding tank that can be erected, disassembled, and re-erected, comprising the steps of:

A. placing a first removable liner buffer over the area where said tank is to be erected;

B. erecting said tank on top of said first liner buffer with the periphery of said first liner buffer extending beyond said tank;

C. placing the outside surface of a second removable liner buffer against the inside surface of said tank above said first liner buffer; and D. placing said liner on top of said first liner buffer within said tank and placing the outside surface of said liner against the inside surface of said second liner buffer, whereby said liner buffer provides a removable protective cushion between said liner and said tank that prevents irregular or sharp surfaces from damaging said liner.

17. The method of protecting a removable liquid impervious liner of a liquid holding tank that can be erected, dismantled, and re-erected, comprising the steps of:

A. placing a first removable liner buffer over the area where said tank is to be erected;

B. placing said liner on top of said first liner buffer and providing the underside of said liner with a plurality of tabs that extend to about the periphery of said first liner buffer;

C. folding said liner upon itself away from said tabs:

D. erecting said tank on top of said first liner buffer and said tabs with the periphery of said first liner buffer and the ends of said tabs extending beyond said tank;

E. placing the outside surface of a second removable liner buffer against the inside vertical surface of said tank above said tabs; and F. unfolding said liner within said tank and placing the outside surface of its unfolded portion against the inside surface of said second liner buffer, whereby said liner buffer provides a removable protective cushion between said liner and said tank that prevents irregular or sharp surfaces from damaging said liner.

18. The method of protecting a removable liquid impervious liner of a liquid holding tank that can be erected, dismantled, and re-erected, comprising the steps of placing the outside surface of a removable liner buffer against the inside surface of said tank and placing the outside surface of said liquid impervious liner against the inside surface of said liner buffer, whereby said liner buffer provides a removable protective cushion between said liner and said tank that prevents irregular or sharp surfaces from damaging said liner, and placing a moisture sensor on top of the inside surface of said liner buffer under said liner, and connecting said moisture sensor to signalling means outside of said tank with an electrical conductor without passing said conductor through said liner buffer or said liner.

19. The method of protecting a removable liquid impervious liner of a liquid holding tank that can be erected, dismantled and re-erected, comprising the steps of placing the outside surface of a removable liner buffer against the inside surface of said tank and placing the outside surface of said liquid impervious liner against the inside surface of said liner buffer, whereby said liner buffer provides a removable protective cushion between said liner and said tank that prevents irregular or sharp surfaces from damaging said liner, and placing a moisture sensor on top of the inside surface of said liner, connecting said moisture sensor to signalling means outside of said tank, placing the outside surface of a second liner buffer over said moisture sensor in contact with the inside surface of said liner, and placing the outside surface of a second liquid impervious liner in contact with the inside surface of said second liner buffer.

20. A tank for holding liquids comprising:

A. an upstanding enclosure having inner and outer surfaces, and upper and lower edges;

B. a removable, flexible, liner buffer within said enclosure, said buffer having inner and outer surfaces, and said liner buffer covering the bottom of said enclosure and extending beneath said lower edge of said enclosure beyond said outer surface of said enclosure;

C. a removable, flexible, liquid impervious inner liner within said enclosure, said liner having inner and outer surfaces, and said liner overlying and substantially conforming in shape to said inner surface of said liner buffer; and D. said inner surface of said liner buffer being held beneath said lower edge of said enclosure, said outer surface of said liner being in contact with said inner surface of said liner buffer, whereby said liner buffer protects said liner from damage.

21. The invention defined in claim 20 wherein said liner comprises a plurality of hold down tabs which extend beyond said outer surface of said enclosure between said lower edge and said liner buffer.

* * * * *